United States Patent [19]

Sun

[11] 4,218,718

[45] Aug. 19, 1980

[54] PROTECTIVE RELAY APPARATUS

[75] Inventor: Shan C. Sun, Bell Township, Allegheny County, Pa.

[73] Assignee: Westinghouse Electric Corp., Pittsburgh, Pa.

[21] Appl. No.: 959,044

[22] Filed: Nov. 8, 1978

[51] Int. Cl.² ............................................. H02H 3/38
[52] U.S. Cl. ....................................... 361/79; 361/83
[58] Field of Search ..................... 361/30, 79, 113, 78, 361/110, 111, 184, 182, 183; 322/58; 324/141, 142

[56] References Cited

U.S. PATENT DOCUMENTS

| | | |
|---|---|---|
| 3,944,846 | 3/1976 | Thompson et al. .................. 361/182 |
| 4,106,071 | 8/1978 | Sun et al. ............................... 361/79 |
| 4,125,884 | 11/1978 | Sun ........................................ 361/79 |

Primary Examiner—J. D. Miller
Assistant Examiner—L. C. Schroeder
Attorney, Agent, or Firm—D. R. Lackey

[57] ABSTRACT

Protective relay apparatus for developing signals responsive to subsynchronous current oscillations in a three-phase electrical power system, and for analyzing the signals to determine when corrective action is necessary. The positive sequence component of a subsynchronous current oscillation is developed via a summing arrangement, which eliminates the need for sequence filters. The positive sequence component of a subsynchronous current oscillation is processed to determine if it is an electrical transient which would shock the mechanical system of a turbine generator, or machine, to be protected, into mechanical resonance. It is also processed to determine if it is due to a growing mechanical oscillation of a turbine generator, such as might be initiated by a change in a parameter related to the turbine generator.

20 Claims, 8 Drawing Figures

PROTECTIVE RELAY APPARATUS

BACKGROUND OF THE INVENTION

1. Field of the Invention

The invention relates in general to protective relays, and more specifically to protective relays for protecting a turbine generator connected to a three-phase electrical power system from experiencing a potentially-damaging subsynchronous oscillation.

2. Description of the Prior Art

Turbine generators which generate electrical power have been severely damaged by shaft torques produced by electrically-initiated mechanical oscillations at resonant frequencies of the mechanical system. Damaging oscillations may build slowly due to interaction between the electrical power system and the mechanical system of the turbine generator; or, a transient of high magnitude, such as due to a short circuit on a series-compensated transmission system, may provide a "shock" torque which initiates a subsynchronous oscillation of the mechanical system at a resonant frequency.

Many different approaches have been used to try to solve the problem presented by subsynchronous oscillations, such as by inserting electrical power filters into the electrical lines to block or dampen subsynchronous currents. Also, additional control has been provided for series capacitors, which reduces short circuit current magnitudes. Additional control has also been provided in the excitation system of the turbine generator, which increases system damping. These approaches to solving the problem, however, may malfunction or fail. Such failure, for example, may be the result of filter detuning, drift of the electrical power system from the synchronous frequency, or failure of initiating signals to reach the series capacitor control. Also, since the problem is very complex, the "solution" may not protect the system against subsynchronous resonance from all possible causes. Thus, it would be desirable to back any solution to the subsynchronous resonance problem with the application of a protective relay which detects an unacceptable subsynchronous oscillation condition and either provides a trip signal for a circuit breaker to remove the turbine generator from the line, or it initiates some other form of corrective action.

A protective relay for such a function must distinguish between subsynchronous oscillations which are potentially harmful, and those which are not, as a turbine generator should only be tripped from the line when damage producing oscillations thereof is imminent. However, since such oscillations may be produced in a very short period of time, the processing speed of the relay must be fast enough to provide the detection and corrective action before actual damage occurs. The protective relay must have a wide operating range and a sensitivity which will detect 0.01 PU (per unit) of subsynchronous current in the presence of a synchronous (i.e., 60 hertz) current of many PU. The subsynchronous current may also have a magnitude of many PU.

My copending application Ser. No. 757,177, filed Jan. 6, 1977 now U.S. Pat. No. 4,125,884 entitled "Apparatus for Detecting Subsynchronous Current in Power Systems", which application is assigned to the same assignee as the present application, discloses new and improved monitoring apparatus for providing a signal responsive to subsynchronous current flowing in an electrical power system. A signal responsive to a current in one of the phases of the three-phase electrical power system is multiplied by a reference signal having a synchronous frequency and a constant amplitude. The product contains components having frequencies equal to: (1) twice the synchronous frequency, (2) the sum of the synchronous frequency and each subsynchronous frequency, and (3) the difference between the synchronous frequency and each subsynchronous frequency. A wideband or bandpass filter passes component (3) which relates directly to subsynchronous oscillation frequencies, while substantially blocking or attenuating components (1) and (2).

Co-pending application Ser. No. 757,178, filed Jan. 6, 1977, now U.S. Pat. No. 4,106,071 entitled "Apparatus for Protection Against Subsynchronous Currents in a Power System", which application is also assigned to the same assignee as the present application, discloses detection apparatus for processing a signal responsive to subsynchronous current in an electrical power system, such as the signal (3) hereinbefore referred to. This detection apparatus provides a trip signal in response to a growing oscillation in the frequency range of interest, such as 15 to 45 hertz, when the oscillation exceeds a predetermined threshold magnitude.

Co-pending application Ser. No. 959,045, filed Nov. 8, 1978 in the names of S. C. Sun and L. L. Church, entitled "Protective Relay Apparatus", which is also assigned to the same assignee as the present application, discloses a three-phase approach to the monitoring and detection functions of a subsynchronous current protective relay. Sequence filters develop signals related to the positive sequence component of any subsynchronous oscillation in a three-phase electrical power system, and narrow band filters, examine the signals for oscillations at preselected frequencies known to be critical mechanical resonance frequencies of the apparatus to be protected. This co-pending application also recognizes that instead of examining only subsynchronous oscillations which are growing in magnitude, that an electrical transient of a particular frequency which exceeds a predetermined magnitude, may shock the mechanical system of a turbine generator into mechanical resonance. Thus, corrective action may be taken earlier than a protective relay which only examines growing oscillations.

SUMMARY OF THE INVENTION

Briefly, the present invention relates to improvements in the protective relay apparatus of co-pending application Ser. No. 959,045, which reduces the cost of the apparatus while providing certain functional advantages. The present invention provides signals responsive to the positive sequence component of subsynchronous current by multiplying each of the three signals related to the three line currents of the electrical power system with different reference signals from a precision three-phase reference source which has a constant amplitude and synchronous frequency. Linear summing of the three resulting products of the multiplication function, and wideband filtering, produce a signal responsive to the positive sequence component of any subsynchronous currents flowing in the associated three-phase electrical power system.

The output of the wideband amplifier is processed in a two stage detection circuit which is responsive to electrical transients from the line. One of the stages provides an output signal when the output of the wideband filter exceeds a first predetermined relatively large magnitude. The other stage operates when the first predetermined magnitude is not exceeded, but a predetermined second magnitude, smaller than the first, is exceeded. The exceeding of the second magnitude initiates a pattern signal for comparison with the output of the wideband filter. If the output of the wideband filter exceeds the pattern signal, the second stage provides an output signal. The output of the wideband filter is also processed by detection circuitry which detects growing oscillations, and it may include a narrow band filter and detection circuitry for each frequency of interest.

BRIEF DESCRIPTION OF THE DRAWINGS

The invention may be better understood and further advantages and uses thereof more readily apparent when considered in view of the following detailed description of exemplary embodiments, taken with the accompanying drawings in which.

DESCRIPTION OF PREFERRED EMBODIMENTS

Figure 1:
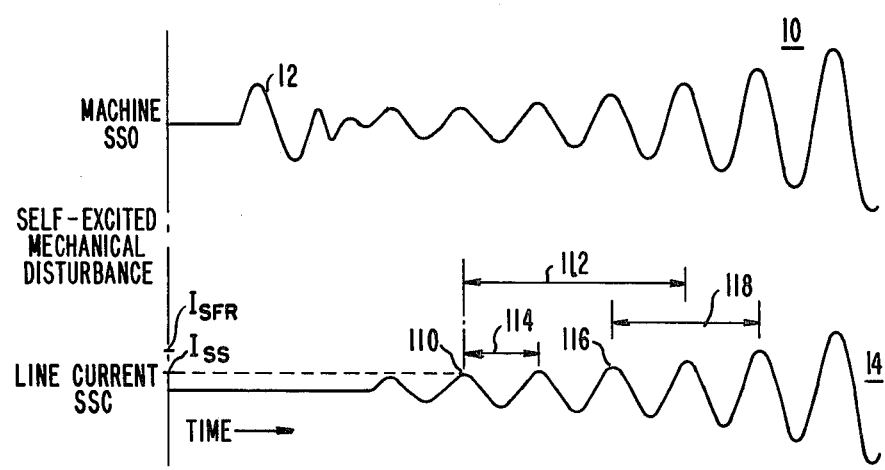
FIG. 1 is a graph which illustrates a subsynchronous oscillation of a turbine generator (machine) caused by a mechanical disturbance in the machine system, and the resulting subsynchronous oscillation produced in the line current.
Figure 2:
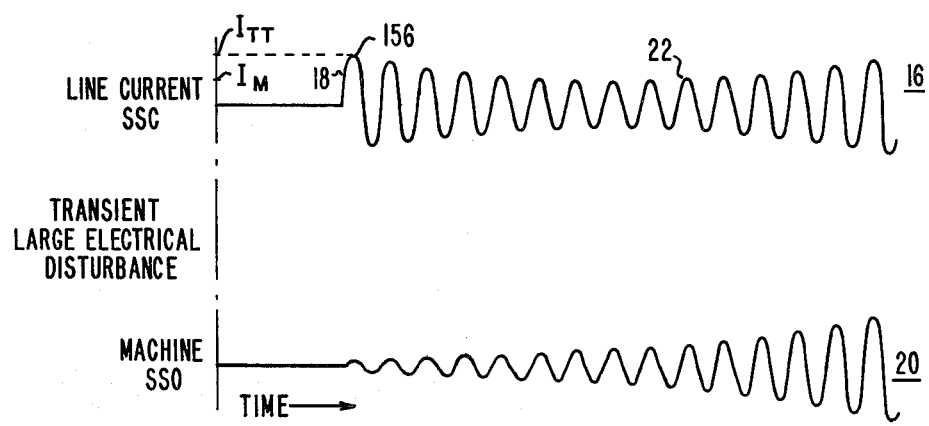
FIG. 2 is a graph which illustrates an electrical transient of relatively large magnitude produced in the electrical system, and a resulting subsynchronous oscillation in the machine.
Figure 3:
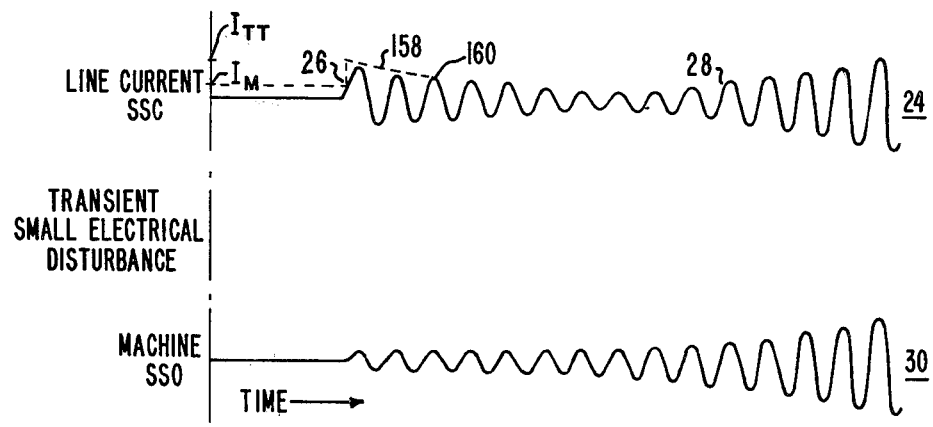
FIG. 3 is a graph which illustrates an electrical transient of smaller magnitude than that of FIG. 2, and the resulting subsynchronous oscillation in a machine.

Referring now to the drawings, and to FIGS. 1, 2 and 3 in particular, there is shown graphs which illustrate that the presence of a subsynchronous oscillation in a phase current of a three-phase electrical power system may result from either mechanical or electrical disturbances, or a combination of both. FIG. 1 includes a curve 10 which represents a subsynchronous oscillation of a turbine generator (machine), which was triggered by a mechanical disturbance at point 12. Most mechanical disturbances will not be of sufficient severity or of the proper frequency to induce damaging mechanical oscillations into the machine. However, when such mechanical oscillations are induced, the damage to the machine can be severe, and thus it is important to protect the machine from such oscillations. An abrupt change in the steam supply is an example of a mechanical disturbance which may trigger resonance.

In FIG. 1, the mechanical disturbance at 12 "shocks" the turbine generator into mechanical resonance at a critical subsynchronous frequency, which will continue to increase in magnitude until the machine is damaged. FIG. 1 also includes a curve 14 which represents the subsynchronous line current in the electrical system which is produced by the subsynchronous oscillation of the machine. It will be noted that there is little or no indication in the line current of the mechanical oscillation 12 which triggers the mechanical resonance. The subsynchronous current oscillation 14 starts with a very small magnitude and continues to grow. Thus, a subsynchronous current oscillation of this nature will be referred to as a "self excited" subsynchronous current oscillation.

A subsynchronous oscillation of the machine may also be triggered by a disturbance in the transmission line or electrical system connected to the machine, which causes an interaction between the electrical system and the machine which results in instability and oscillation. For example, a transient subsynchronous current oscillation having a frequency at or near one of the critical frequencies of the turbine generator, such as produced by a severe transmission fault, i.e., a line-to-line, or a line-to-ground short circuit, may induce a mechanical subsynchronous oscillation into the machine which has a rapidly growing amplitude. In this instance, the subsynchronous current signal in the phase current of the electrical system is initially dominated by the fault produced subsynchronous current transient. As the fault produced subsynchronous current decays, the reflected subsynchronous current from the machine will become dominant. FIG. 2 graphically sets forth this situation, with curve 16 illustrating a subsynchronous transient which starts at 18 with a relatively large magnitude and then it decays. This transient has the necessary magnitude and frequency to cause the machine to mechanically oscillate with a growing oscillation at a subsynchronous resonant or critical frequency. Curve 20 illustrates the growing mechanical oscillation of the machine. The subsynchronous current shown at curve 16 then ceases to decay as the machine oscillation becomes more dominant, and the subsynchronous current starts to grow at 22 as the machine oscillation continues to build.

FIG. 3 is a graph which illustrates that even a smaller electrical disturbance, such as a switching surge, or a higher reactance fault, may produce a transient having a frequency and duration sufficient to induce mechanical subsynchronous resonance of the machine. Curve 24 represents the subsynchronous line current initially caused by an electrical disturbance at 26, which decays, and then, due to the mechanical oscillation of the machine, it starts a growing oscillation at 28. Curve 30 illustrates the growing subsynchronous oscillation of the machine which causes the increase in the subsynchronous current at 28 of curve 24.

The hereinbefore-mentioned co-pending application Ser. No. 959,045 built upon the protective relay system disclosed in the hereinbefore mentioned co-pending applications Ser. No. 757,177 and 757,178, by providing a three-phase protective relay which utilizes sequence filters and narrow band filters. These filters provide signals responsive to the positive sequence components of subsynchronous currents at specific frequencies which are known to be critical to the associated turbine generator. A detecting function responsive to these signals is also disclosed in this co-pending application which distinguishes between subsynchronous currents due to mechanically induced self-excited oscillations, and those due to electrical transients, to provide timely signals in either instance, such as trip signals for the circuit breaker which connects the turbine to the electrical power system. The present invention, intiated by the inventive contributions of all of the hereinbefore-mentioned co-pending applications, presents new and improved protective relay apparatus with enables positive sequence components of subsynchronous current oscillations to be obtained without requiring the use of sequence filters. The present invention also provides new and improved detection apparatus for analyzing the subsynchronous current signals. Since apparatus for performing certain of the block functions of the present invention are shown and described in detail in the hereinbefore mentioned co-pending applications, these applications are hereby incorporated into the present application by reference.

The present invention provides an accurate and reliable indication of harmful subsynchronous currents by monitoring the positive sequence components of subsynchronous currents, both before and after narrow band filtering of the subsynchronous signals. The narrow band filtering selects a specific subsynchronous frequency, or selected frequencies, which are known to be mechanical resonant frequencies of the specific turbine generator to be protected. Accuracy and reliability are assured by providing subsynchronous current signals which are responsive to the positive sequence component of the subsynchronous current, with the collective subsynchronous current in a broad subsynchronous band or range being examined for transients, and with the monitored frequency, or frequencies, being examined for self-excited oscillations. Since only the positive sequence component of subsynchronous current is capable of providing damaging shaft torques, a more reliable relay is provided by only examining this component. Still further, the three-phase approach of the invention, required by the determination of a positive sequence component, presents a complete representation of a subsynchronous current.

Figure 4:
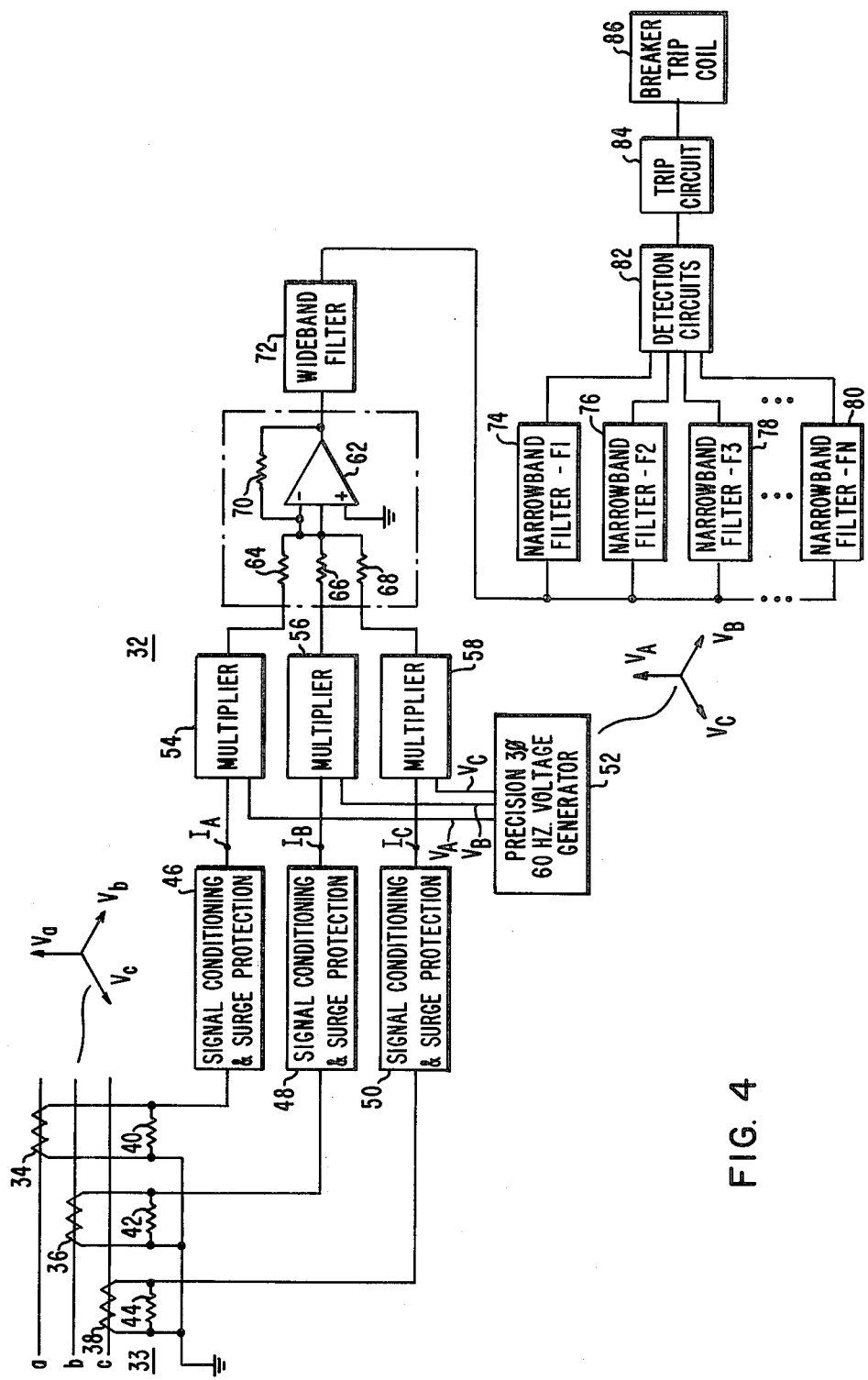
FIG. 4 is a partially schematic and partially block diagram of protective relay apparatus constructed according to the teachings of the invention.

FIG. 4 is a partially schematic and partially block diagram of a protective relay system 32 constructed according to the teachings of the invention. Protective relay 32 requires certain current-related signals $I_A$, $I_B$ and $I_C$ from the three-phase electrical power system being monitored, and a three-phase reference signal which includes signals $V_A$, $V_B$ and $V_C$. The reference signals $V_A$, $V_B$, $V_C$ may be provided from the line voltages of the electrical power system, or from a separate precision three-phase voltage generator which is part of the protective relay package, as will be hereinafter explained. FIG. 4 illustrates a three-phase electrical power system 33 having conductors a, b, and c connected to the turbine generator to be protected. While the protective relay is primarily for the protection of a turbine generator, it is also to be understood that it may be used to protect other types of machines connected to an electrical power system, such as large motors and induction generators. The generator of the turbine generator generates a three-phase voltage at a synchronous frequency, such as 60 hertz. Current transformers 34, 36 and 38 provide current signals responsive to the current flowing in conductors a, b and c, respectively and resistors 40, 42 and 44 convert the current signals to voltage form. The signal voltages responsive to the current flowing in conductors a, b and c are applied to signal conditioning and surge protection circuitry 46, 48 and 50, respectively. This circuitry, which may include an operational amplifier active filter and Zenor diodes for suppressing high-frequency noise and limiting current surges, is shown in detail in the incorporated application Ser. No. 757,177. The outputs of circuit 46, 48 and 50 provide the required current related signals $I_A$, $I_B$ and $I_C$ for protective relay 32, and they will contain synchronous components and any subsynchronous currents which are flowing in the electrical power system 33.

The reference signals $V_A$, $V_B$ and $V_C$ are three-phase sinusoidal voltages at the synchronous frequency, which have a constant amplitude. They may each be provided in the same manner as the reference signal $V_A$ in the incorporated application Ser. No. 757,177 by potential transformers having primary windings connected to the line conductors, and secondary windings connected to signal conditioning and overvoltage protective circuitry. The conditioned voltage signal is applied to a limiter which forms a square wave of constant amplitude at the synchronous frequency, and to a low pass active filter which converts the square wave to a sinusoid. Suitable signal conditioning, limiting and filtering circuitry is shown in detail in the incorporated application Ser. No. 757,177. Or, as illustrated in FIG. 4, signals $V_A$, $V_B$ and $V_C$ may be provided by a precision three-phase voltage generator 52 which generates the three signals at the synchronous power frequency.

Generator 52 need not be sync'ed in phase to the electrical power system 33, as any signals related to phase angle are subsequently filtered from the subsynchronous current signals developed according to the invention, as will hereinafter be explained.

Figure 4A:
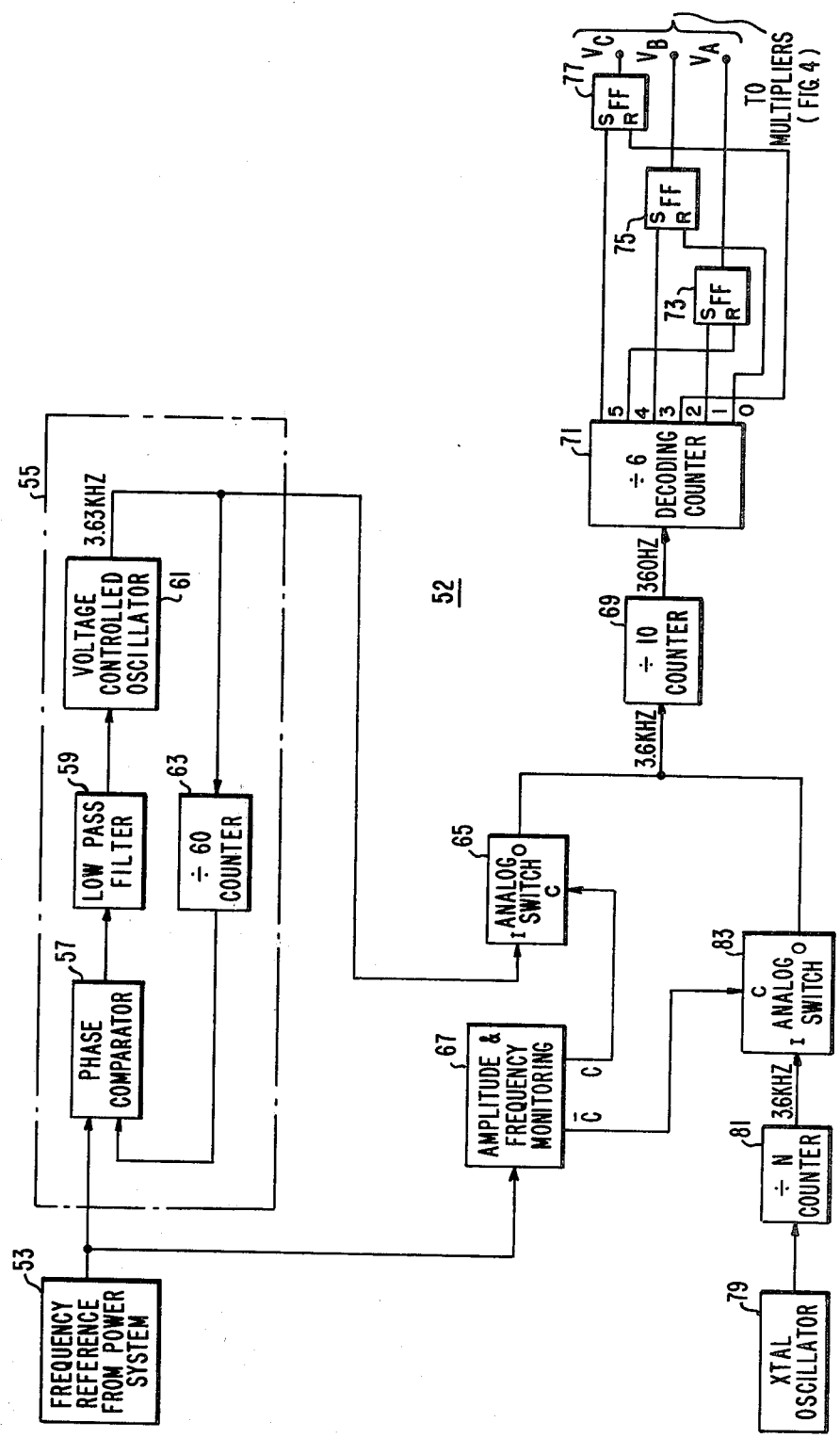
FIG. 4A is a detailed block diagram of a three-phase voltage generator which may be used in the protective relay apparatus shown in FIG. 4.

FIG. 4A is a detailed block diagram of a precision three-phase 60 Hz voltage generator 52, which may be used to perform the function referenced 52 in FIG. 4. The arrangement shown in FIG. 4A allows the frequency of the electrical power generator, or electrical system, to be used as a reference, as long as the amplitude and frequency of this signal are within predetermined limits. If the amplitude and/or frequency are outside these limits, a crystal controlled voltage source automatically takes over, to provide voltage signals of the proper magnitude at 60 Hz. This arrangement has the advantage of providing signals exactly responsive to the frequency of the electrical generator, or power system, as long as this frequency does not stray too far from the nominal synchronous frequency.

More specifically, a reference device 53 provides a signal having a predetermined magnitude, and a frequency responsive to the generated frequency. For example, device 53 may include a toothed wheel, and a pick-up which provides a signal in response to the teeth, with the toothed wheel being driven in response to the mechanical drive system of an electrical generator to be protected. The signal from device 53 is applied to a phase locked loop 55. Phase locked loop 55 includes a phase comparator 57, a low pass filter 59, a voltage controlled oscillator 61, hereinafter referred to as VCO 61, and a divide-by-60 counter 63. The signal from device 53 is applied to one input of phase comparator 57, the output of phase comparator 57 is applied to the low pass filter 59, and the output of filter 59 provides a filtered error signal voltage for controlling the output frequency of VCO 61. VCO 61 nominally provides a signal having a frequency of 3.6 KHz. Its output is fed back to another input of comparator 57 via the divide-by-60 counter 63. Any difference between the frequency of VCO 61 and the frequency of the signal from device 53 produces an error signal which causes the VCO to track the frequency of the signal from device 53.

The output of VCO 61 is applied to an input terminal of an analog switch 65, such as RCA's CD4016A. If the amplitude and frequency of the signal from device 53 are in their desired ranges, a power supply monitor 67 provides a true signal C for the control input of switch 65, which effectively closes the switch. The frequency of the signal at the output of switch 65 is divided by 10 in a divide-by-10 counter 69. The output of counter 69 is applied to the input of a divide-by-6 counter 71 having six decoded outputs 0 through 5.

Three set-reset flip-flops 73, 75 and 77 are responsive to the outputs of counter 71. The set-reset inputs of flip-flop 73 are connected to outputs 1 and 4, respectively, the set-reset inputs of flip-flop 75 are connected to outputs 3 and 0, respectively, and the set-reset inputs of flip-flop 77 are connected to outputs 5 and 2, respectively.

The outputs of flip-flops 73, 75 and 77 provide three square wave signals 120 degrees out of phase with one another, which may be used directly as signals $V_A$, $V_B$ and $V_C$, without filtering to convert the square wave signals to sine waves. The 60 Hz beat signal which results from the 180 Hz harmonic of the square wave signals beating with the 120 Hz component of the current related signal, should be sufficiently attenuated in subsequent wide band filtering in the circuit of FIG. 4. If the attenuation is not sufficient, a single notch filter tuned to 60 Hz may be provided at the output of the wide band filter, thus requiring less hardware than the three filters which would be required to convert the three square wave signals to sine waves.

A back-up reference includes a crystal oscillator 79, a divide-by-N counter 81, and an analog switch 83. Analog switch 83 is normally "off", in response to a low signal $\overline{C}$ from the power supply amplitude and frequency monitor 67.

If device 53 fails to provide a signal having an amplitude and frequency in the required ranges, monitor 67 provides a low signal C, to open switch 65, and a high signal $\overline{C}$ to close switch 83. Thus, counter 69 continues to receive a signal of the required amplitude and frequency. When the signal from device 53 returns to normal, monitor 67 waits for a predetermined period of time to allow the phase locked loop 55 to settle, before switching back to source 53.

The 3.6 KHz frequency is an arbitrarily selected high frequency which enables the switching between the two different sources to be achieved without suffering a significant aberration in the 60 Hz signals $V_A$, $V_B$ and $V_C$ due to a phase mis-match in the 3.6 KHz signals at the time of switching.

Returning to FIG. 4, the current related signals $I_A$, $I_B$ and $I_C$ are multiplied by the reference signals $V_A$, $V_B$ and $V_C$, respectively, in synchronous modulators or multipliers 54, 56 and 58, respectively. As hereinbefore stated, the phase angle between the multiplied signals is not important because of subsequent filtering, but the phase rotations must be the same. In other words, once a reference signal is picked to multiply times a phase current signal, the phase current signals that follow the selected phase current signal, in phasor rotation, must be multiplied by the reference signals which follow the selected reference signal, in phasor rotation.

The multiplication function may be performed by a precision analog multiplier, such as one of Intronix Corporation's M310 series. As explained in the incorporated application Ser. No. 757,177, a multiplication function eliminates the synchronous frequency component $\omega_0$ and provides a signal with three components, (1) a double synchronous frequency term $2\omega_0$, (2) a beat frequency term $(\omega_0+\omega_s)$ for each subsynchronous current frequency $\omega_s$ present, and (3) a beat frequency term $(\omega_0-\omega_s)$ for each subsynchronous current frequency present. In the incorporated application Ser. No. 757,177, a bandpass filter attenuates the relatively high frequency components (1) and (2), providing a signal (3) related to all of the subsynchronous components $(\omega_0-\omega_s)$ flowing in one of the line conductors of the electrical power system. The signal is then used by detector apparatus disclosed in the second incorporated application Ser. No. 757,178. The single-phase approach of these two incorporated applications could be applied to each line of a three-phase system, providing three different signals related to subsynchronous current flowing in the three line conductors of the system. Co-pending application Ser. No. 959,045, discloses a new and improved three-phase protective relay which differs from the incorporated application by: (a) filtering the subsynchronous current signal with a sequence filter and with a narrow band filter, to provide a signal related to the positive sequence component of each discrete subsynchronous current frequency of interest, and (b) by recognizing that additional protection may be provided by distinguishing between the relatively slow, self-excited subsynchronous current oscillation which grows in magnitude, and a transient subsynchronous oscillation of high initial magnitudes which may shock the turbine generator into mechanical resonance.

The present invention discloses a new and improved protective relay which provides the positive sequence component of subsynchronous current signals, without the use of sequence filters. The present invention further discloses new and improved transient detection circuitry which adds another dimension to the detection aspect of the subsynchronous current protective relay.

To provide the positive sequence components of any subsynchronous current flowing in the electrical power system 33, the outputs of multipliers 54, 56 and 58 are linearly summed in summing means 60. Summing means 60, as illustrated, may be an operational amplifier adder, which includes an OP AMP 62 and resistors 64, 66, 68 and 70. Resistors 64, 66 and 68 connect the outputs of multipliers 54, 56 and 58, respectively, to the inverting input of OP AMP 62, and resistor 70 is a feedback resistor connected to the output of the OP AMP back to its inverting input. The non-inverting input is connected to common or ground. When the values of the four resistors are equal to one another, the output of the OP AMP adder is equal to the sum of the inputs.

The output of the summing means 60 is applied to a wideband or bandpass filter 72, to attenuate the $2\omega_0$ and $(\omega_0 \rightleftarrows \omega_s)$ terms, and any terms responsive to phase angle, while passing the $(\omega_0-\omega_s)$ term. The summing and filtering are linear and thus the filtering may be applied before the summing means. The order shown is based on hardware considerations, as it requires only one wideband filter, instead of three.

The wideband filter 48 may be in the 17th order (13th order low pass and 4th order high pass) modified Butterworth design shown in detail in the incorporated application Ser. No. 757,177, which has a bandwidth of approximately 30 hertz (15 to 45 hertz).

The multiplying of each of the three-phase currents by the three references from the three-phase source, the summing of the three products thereof, and the wideband filtering of the sum, produces the positive sequence component of any subsynchronous currents flowing in the electrical power system, as shown by the following:

Assume that the sequence components of a certain subsynchronous frequency, $\omega_s$, in a given system are:

(1)

$I_0 = I_\alpha \cos \omega_s t$ zero sequence, $I_1 = I_\beta \cos (\omega_s t + \phi_1)$ positive sequence, and $I_2 = I_\gamma \cos (\omega_s t + \phi_2)$ negative sequence.

Thus, by definition, the phase currents of $\omega_s$ are, in phasor notation:

(2)

$I_{AS} = I_0 + I_1 + I_2$, $I_{BS} = I_0 + a^2 I_1 + a I_2$, and $I_{CS} = I_0 + a I_1 + a^2 I_2$ where $a = e^{j120}$.

Substituting (1) into (2):

(3)

$I_{AS} = I_\alpha \cos \omega_s t + I_\beta \cos (\omega_s t + \phi_1) + I_\gamma \cos (\omega_s t + \phi_2)$, $I_{BS} = I_\alpha \cos \omega_s t + I_\beta \cos (\omega_s t + \phi_1 + 240°) + I_\gamma \cos (\omega_s t + \phi_2 + 120°)$, and $I_{CS} = I_\alpha \cos \omega_s t + I_\beta \cos (\omega_s t + \phi_1 + 120°) + I_\gamma \cos (\omega_s t + \phi_2 + 240°)$.

Assume that the components of the subsynchronous current are given by (1), (2) and (3) and that the three-phase reference voltages are:

(4)

$V_A = \cos \omega_o t$, $V_B = \cos (\omega_o t - 120°)$, and $V_C = \cos (\omega_o t + 120°)$.

After multiplication and wideband filtering, we have:

(5)

$I_{AS}' = [I_{AS} \times \cos \omega_o t]$ band-passed $= I_{60} \cos (\omega_o - \omega_s)t + I_\beta \cos [(\omega_o - \omega_s)t - \phi_1] + I_\gamma \cos [(\omega_o - \omega_s)t - \phi_2]$, $I_{BS}' = [I_{BS} \times \cos (\omega_o t - 120°)]$ band-passed $= I_\alpha \cos [(\omega_o - \omega_s)t - 120°] + I_\beta \cos [(\omega_o - \omega_s)t - \phi_1] + I_\gamma \cos [(\omega_o - \omega_s)t - \phi_2 + 120°]$, and $I_{CS}' = [I_{CS} \times \cos (\omega_o t + 120°)]$ band-passed $= A_\alpha \cos [(\omega_o - \omega_s)t + 120°] + I_\beta \cos [(\omega_o - \omega_s)t - \phi_1] + I_\gamma \cos [(\omega_o - \omega_s)t - \phi_2 - 120°]$.

Summing yields:

(6)

$I_{AS}' + I_{BS}' + I_{CS}' =$
$I_\alpha \{\cos[(\omega_o - \omega_s)t] + \cos[(\omega_o - \omega_s)t - 120°] + \cos[(\omega_o - \omega_s)t + 120°] + I_\beta 3 \cos[(\omega_o - \omega_s)t - \phi_1]\}$
$+ I_C \{\cos[(\omega_o - \omega_s)t - \phi_2] + \cos[(\omega_o - \omega_s)t - \phi_2 - 120°] + \cos[(\omega_o - \omega_s)t - \phi_2 + 120°]\}$
$= I_\alpha [0] + I_\beta 3 \cos[(\omega_o - \omega_s)t - \phi_1] + I_\gamma [0]$
$= 3 I_\beta \cos[(\omega_o - \omega_s)t + \phi_1]$, which provides positive sequence detection.

Certain critical subsynchronous frequencies, known to be mechanical resonance frequencies of the machine to be protected, are selectively examined by providing narrow band filters for filtering the output of the wideband filter 72. In the usual turbine generator system, only two or three mechanical resonance frequencies will be of interest. For example, narrow band filters 74, 76, 78 and 80 are illustrated, tuned to subsynchronous frequencies F1, F2, F3 and FN, respectively.

Each of the narrow band filters preferably has a bandwidth of only a few hertz, such as 3 Hz. For example, each of the narrow band filters may be 4th order, consisting of two second order bandpass filters, stagger-tuned for maximally flat response at the desired bandwidth. The transfer function of the narrow band filter is:

$$\frac{a\omega_1 s}{s^2 + a\omega_1 s + \omega_1^2} \cdot \frac{a\omega_2 s}{s^2 + a\omega_2 s + \omega_2^2}$$

where $\alpha = 1/Q$ and Q is the desired selectivity of the combined two second order stages, and $\omega_{1,2}$ are the center frequencies of the second order stages.

The detection system, shown generally at 82, which utilizes the signals responsive to the positive sequence components of the subsynchronous currents at predetermined frequencies, may, for example, include a transient detector, and a self-excited detector, for each monitored frequency. Co-pending application Ser. No. 959,045 illustrates a transient level detector which may be used, and application Ser. No. 757,178 illustrates a self-excited detector which may be used. A detection of a subsynchronous current having a critical frequency results in the detection circuits 82 providing a signal which may be used to take appropriate corrective action. For example, the output signal provided by the detection circuits may be applied to a trip circuit 84, which in turn provides a trip signal for the trip coil 86 of a circuit breaker which connects the protected machine to the three-phase electrical power system 33.

Figure 5:
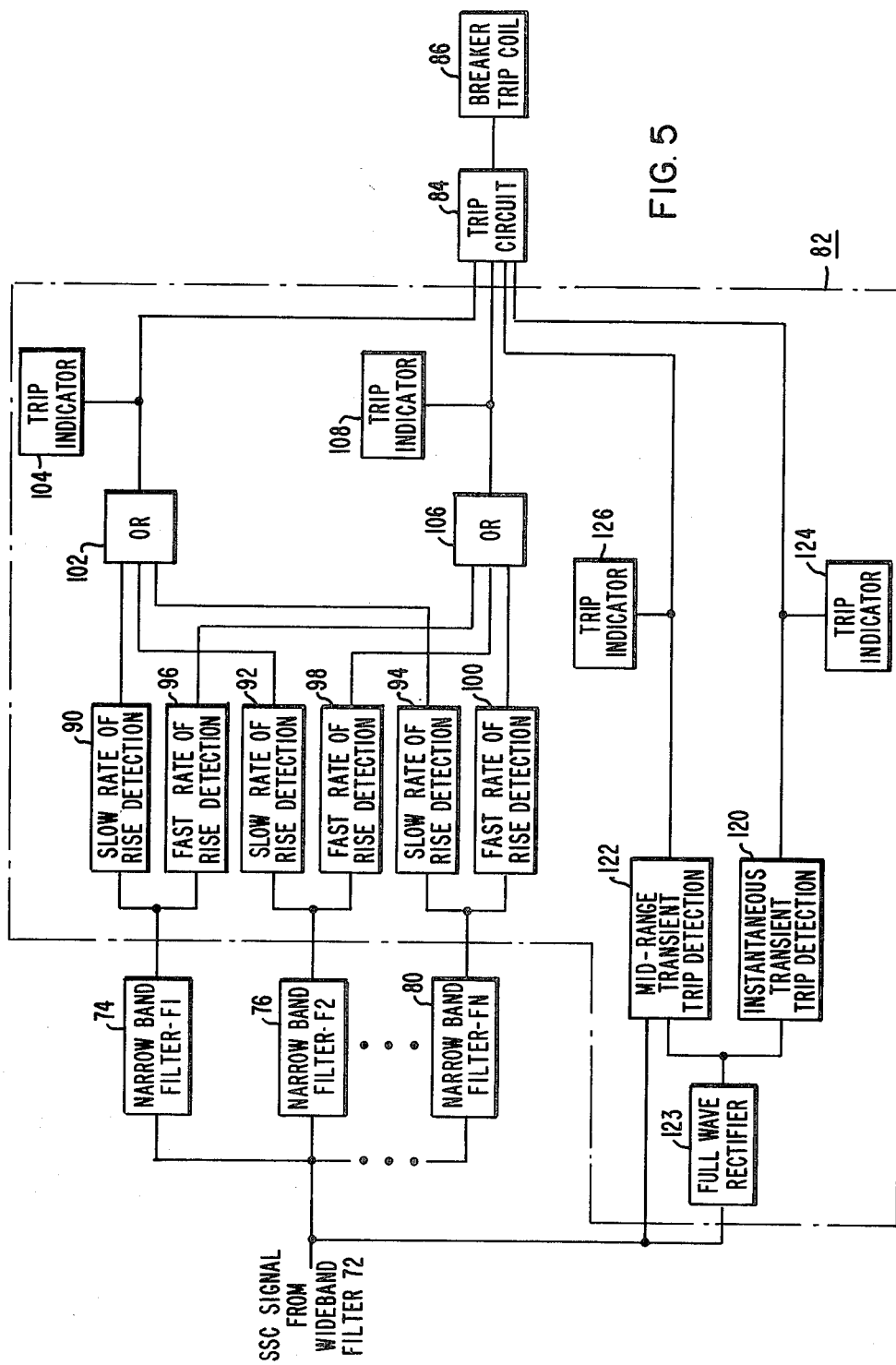
FIG. 5 is a block diagram of a detection circuit constructed according to the teachings of the invention, which is responsive to both transient subsynchronous current oscillations produced by the electrical system, and growing subsynchronous oscillations produced by the machine being protected.

FIG. 5 is a detailed block diagram which illustrates a new and improved detection arrangement 82 constructed according to the teachings of the invention. This arrangement reduces the trip time for transient conditions by sensing the outputs of the narrow band filters, and also the outputs from the wide band filter. It is recognized that the first pulse of a large transient is not conducive to frequency discrimination, and that a quicker response to such a transient may be made if the subsynchronous current signals are not passed through a narrow band filter. It is further recognized that some transients may not have a large enough initial magnitude to warrant an instantaneous trip of a generator circuit breaker, but that transients below this magnitude, but above a predetermined threshold magnitude, may initiate subsynchronous oscillation of a machine connected to an electrical power system. The present invention provides means for evaluating such midrange transients.

More specifically, FIG. 5 illustrates a detection system 82 which will handle all known subsynchronous current conditions of a turbine generator, as it is presently understood. Each specific subsynchronous frequency of interest, filtered from the pass band of about 15 Hz to 45 Hz by the narrow band filters, is examined to determine if it exceeds a magnitude which warrants further concern, and those which warrant such further concern are then examined to determine if the oscillation is growing, and the rate of rise is also noted.

As hereinbefore set forth relative to FIGS. 1, 2 and 3, a growing subsynchronous current may be either the result of a subsynchronous oscillation in the machine, initiated by pure mechanical means, or produced by electrical disturbances in the transmission system. If initiated by a transient in the electrical system, a transient portion of the detection circuit may provide a trip signal if it meets predetermined parameters, but when the transient circuit does not call for corrective action, the self-excited portion of the circuitry will detect an actual subsynchronous oscillation of the machine.

There are two functional parts to this portion of the trip detection system, (1) a slow rate-of-rise trip (SRRT) and a fast rate-of-rise trip (FRRT).

The SRRT function is provided for each subsynchronous frequency of interest, as indicated at 90, 92 and 94 for frequencies F1, F2 and FN, respectively, and the FRRT function is provided for each subsynchronous frequency of interest, as indicated at 96, 98 and 100.

The SRRT function monitors a SCC occurrence over a period of time given by $$\text{time to trip} = T = T_o + k/I_s,$$

where $T_o$ = a fixed time value, which may be set at 200 ms or more,
k = a constant, and
$I_s$ = current magnitude of the SSC.

For a SSC to qualify for a SRRT trip, it must satisfy the following conditions:

(1) $I_s$ must be higher than a threshold, designated $I_{ss}$ ($I_s$ start threshold), to start the trip time T.

(2) Each succeeding peak of $I_s$ must be equal to or greater than the peak immediately preceeding, i.e., $$I_p(n+1) \geq I_p(n),$$

where $I_p(n)$ = peak value of $I_s$ at nth peak and $I_p(n+1)$ = peak value of $I_s$ at (n+1)th peak.

(3) At time t=T, $I_s$ must be greater than a threshold level designated as $I_{sf}$ ($I_s$ finish threshold).

The FRRT detection is similar to SRRT but is designed to yield a shorter trip time when a SSC with a fast growing rate is encountered. The trip time in this case is a fixed value and is designated $T_1$. The requirements for a FRRT detection are:

1. $I_s$ must be greater than a setting designated $I_{sfr}$,
2. each peak must be larger than the prior peak by a fixed percentage δ, i.e., $$I_{p(n+1)} > (1 + \delta/100)I_{p(n)},$$

(or within a given time period there must be another peak greater than the one encountered), and 3. after completing the time $T_1$, one more rising peak must be encountered before permitting a trip signal generation.

It is noted that FRRT and SRRT do not preclude each other. A SSC occurrence could first be in SRRT then in FRRT. It could also be back in SRRT if the rate of growth slowed.

For a given occurrence the maximum trip time is limited to T, and the minimum trip time is $T_1$. If a given occurrence spent part of its growing time as a SRRT case and the remainder of its growing time as a FRRT case then the total trip time would fall between $T_1$ and T.

Circuitry for performing the SRRT and FRRT functions is shown in detail in the incorporated application Ser. No. 757,178. The circuitry in this co-pending application for ensuring that the subsynchronous frequency of the signal is within a predetermined range need not be used, as the narrow band filters of this invention will ensure that the signal being examined is in a very narrow frequency band of 1 or 2 Hz.

The outputs of the SRRT functions 90, 92 and 94 are OR'ed in an OR circuit 102, which circuit provides a trip signal for a trip indicator 104, such as a counter, or a flag, and for the trip circuit 84.

The outputs of the FRRT functions 96, 98 and 100 are OR'ed in an OR circuit 106, which circuit provides a trip signal for a trip indicator 108 and for the trip circuit 84.

FIG. 1 illustrates the application of the SRRT and FRRT functions to the growing transient 10 illustrated. If a start threshold $I_{ss}$ is exceeded at point 110, it will start the relatively long trip time, indicated at 112. If a threshold $I_{sfr}$ is exceeded, it will change the trip time to a shorter value. If $I_{sfr}$ is exceeded at point 110, for example, the shorter trip time is indicated at 114. The "one more peak" requirement for the FRRT function brings the minimum trip time to point 116, and the tripping range is indicated at 118.

The transient trip portion of the detection system 82 is devised to capture critical subsynchronous current occurrences produced primarily by a disturbance in the transmission system of "high" to "medium" magnitudes. A typical subsynchronous current waveform of this kind is shown in FIG. 2. A generator, when encountering such a subsynchronous current, ust be tripped quickly in order to prevent shaft damage. A certain inverse time characteristic is tolerable for a transient trip, and this is an important factor in forming the transient detection system of the invention.

There are two trip functions in the transient trip detection. The first is an instantaneous transient trip (ITT), illustrated at 120, which may have a trip level set between 2 and 3 PU. This trip circuit, which may simply be an OP AMP level detector, as shown in Ser. No. 959,045, will commence a trip immediately following a crossing of the level setting by the subsynchronous current signal. The second function is a mid-range transient trip (MRTT), illustrated at 22, which covers a range from about 0.5 to 1.5 PU.

It will be noted that the transient trip functions 120 and 122 are connected to receive the output of the wideband filter 72, instead of being applied to the outputs of the narrow band filters. This arrangement eliminates the time delay imposed by the narrow band filters, permitting an earlier trip when conditions dictate that a trip is necessary in order to protect the associated machine. As illustrated in FIG. 5, the output of the wideband filter 72 may be applied to a full wave rectifier 122 before being applied to the transient trip functions 120 and 122, in order to facilitate the examination of each half-cycle of the transient.

The outputs of the transient trip detection functions 120 and 122 are applied to the trip circuit 84, and also to trip indicators 124 and 126, respectively.

Figure 6:
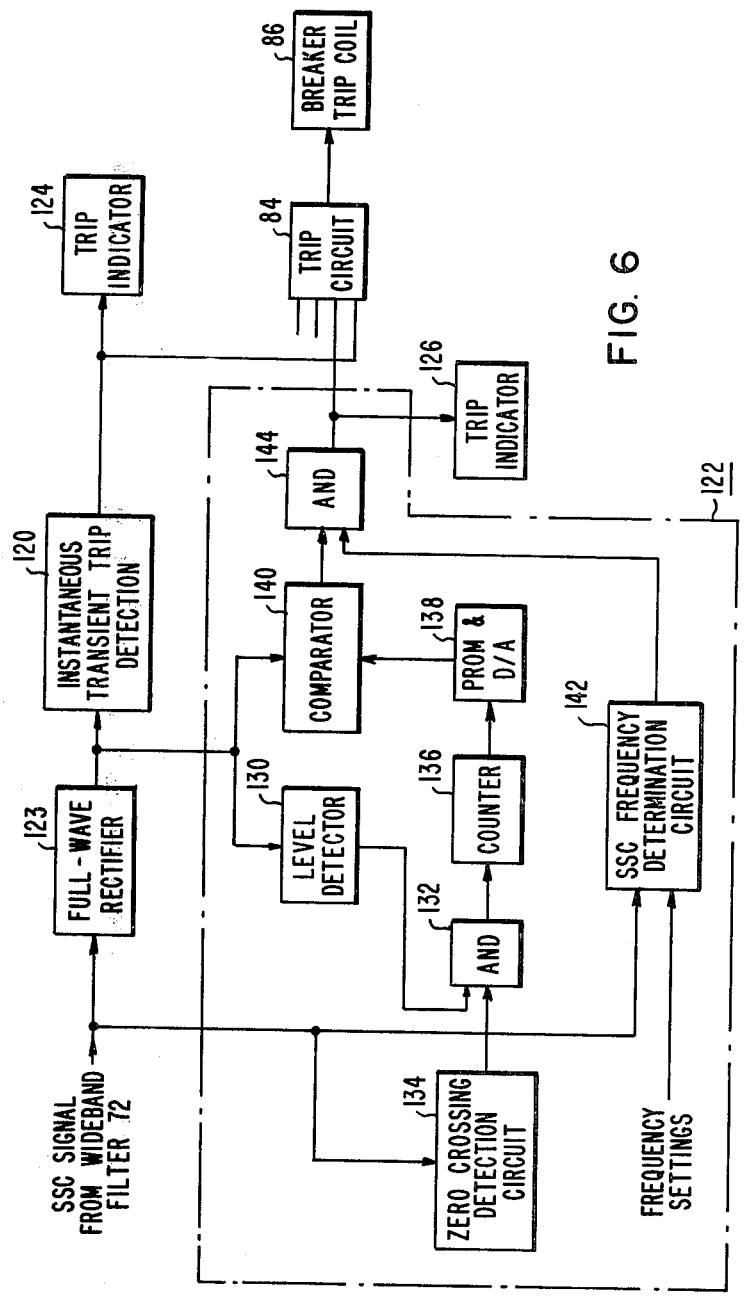
FIG. 6 is a detailed block diagram of a transient detector which may be used for the mid-range and instantaneous transient trip function shown in FIG. 5.

The mid-range transient trip function 122 is shown in detail in FIG. 6. In general, in order to initiate a trip of the MRTT type, the initial amplitude of the subsynchronous current transient must be greater than a level designated as the monitoring level. The output of a full wave rectifier 122 is applied to a level detector circuit 130. If the output of the full wave rectifier 122 exceeds a predetermined magnitude $I_M$, its output goes high or to a logic one level. Level detector 130 may be an OP AMP level detector and a retriggerable monostable, which provides a logic one signal as long as each peak exceeds $I_M$. The output of the level detector circuit 130, when high, enables a dual input AND gate 132. The other input to AND gate 132 is connected to a zero crossing detection circuit 134. The zero crossing detection circuit 134 is responsive to the subsynchronous transient output signal from the wideband filter 72, prior to the rectification function 122. Zero crossing detection circuit may include an OP AMP differentiator which provides a pulse each time the subsynchronous current signal goes through zero, and a one-shot which provides a logic one signal in response to each such pulse. Thus, if the subsynchronous current signal exceeds the threshold $I_M$, AND gate 132 will output a logic one signal each zero crossing of the subsynchronous current signal.

The output of AND gate 132 is applied to a binary counter 136 which addresses a programmable read only memory (PROM) 138 and d/a converter. PROM or memory 138 is programmed to provide a decaying digital step signal which is converted to analog form to provide a pattern for one input of a comparator 140. The other input of comparator 140 is connected to the output of the full wave rectifier 122. If the output of the full wave rectifier 122 exceeds the pattern signal provided by PROM 138, comparator 140 provides a logic one output signal. The logic one output signal of comparator 140 may be used as a trip signal, in which case, it would be applied directly to trip circuit 84. However, it would also be suitable to couple the indication that the subsynchronous current signal has exceeded the pattern, with an indication that the subsynchronous current signal is in a frequency range which is close to one of a critical or resonance frequencies of the machine being protected. In this event, a frequency determination circuit 142 would be connected to receive the output of the wide band filter 72, and various frequency settings would be loaded or dialed into the circuit, such as via thumbwheel switches, in order to set the parameters of the frequency range, or ranges. If the subsynchronous current is within one of a selected frequency bands, circuit 142 outputs a logic one signal. The frequency determination circuit may be the same as the one disclosed in co-pending application Ser. No. 757,178, which is used in that application in order to determine if the subsynchronous current signal is between 15 Hz and 45 Hz. The outputs from comparator 140 and the frequency determination circuit 142 are applied to an AND gate 144. If comparator 140 indicates the subsynchronous current has exceeded the pattern signal, and the frequency determination circuit indicates the subsynchronous current signal is within a predetermined frequency band, AND gate 144 will provide an output signal for the trip circuit 84.

Figure 7:
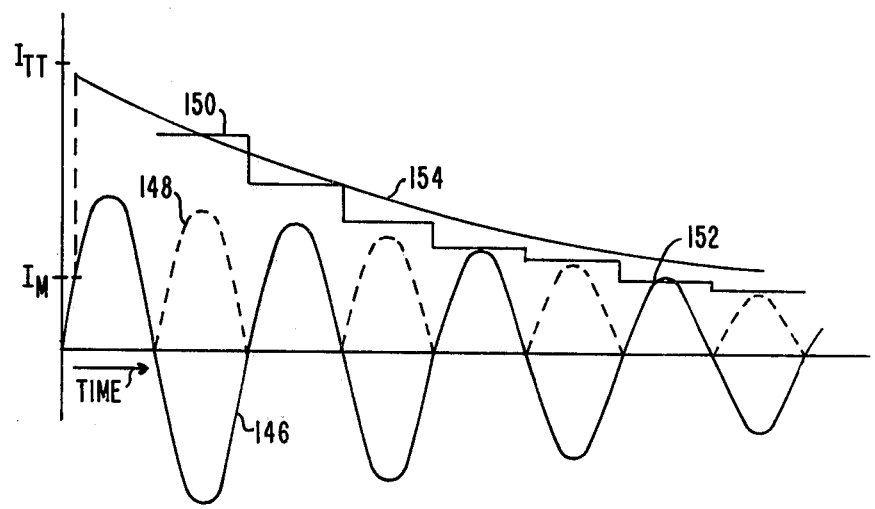
FIG. 7 is a graph which illustrates the operation of the mid-range transient trip function shown in FIGS. 5 and 6.

FIG. 7 is a graph which illustrates the operation of the mid-range transient trip circuit 122. The solid curve 146 indicates a transient subsynchronous current signal at the output of the wideband filter 72, and the broken line curve 148 indicates the full wave rectification of the subsynchronous current signal. It will be noted from the graph in FIG. 7 that the large initial pulse of the subsynchronous current transient 146 has not reached the setting $I_{TT}$, and thus the level detector of the instantaneous transient trip detector 120 will not issue a trip signal. However, signal 146 has exceeded the smaller threshold setting $I_M$ of the level detector 130, and the counter 136 is actuated to cause PROM 138 to start clocking out a predetermined step pattern 150. The step pattern 150 has an inverse characteristic. If within the monitoring period, the amplitude of the subsynchronous current curve 146 is always smaller than the decaying reference pattern 150, no trip signal will be produced, and this particular occurrence of the subsynchronous current transient is considered non-critical in terms of its transient behavior. If the subsynchronous current curve 146 does exceed the pattern signal, such as illustrated at 152, comparator 140 will output a logic one signal, and if the subsynchronous current signal is within a critical frequency band, a trip signal will be produced.

It should be noted that the pattern signal 150 is stepped in response to the frequency of the subsynchronous current transient. It is felt that this is a very desirable feature, but an alternate embodiment may be to have the level detector 130 simply actuate a generator which provides a smoothly decaying signal 154 as a function of time, with no relationship to the frequency of the subsynchronous current signal.

The functioning of the transient trip circuitry is also shown in FIGS. 2 and 3. In FIG. 2, the first pulse of the transient 16 exceeds the level setting $I_{TT}$, and an instantaneous trip signal would be issued at point 156. The mid-range transient trip circuit, which is frequency responsive, would not have started its pattern, as the first zero crossing point would not have occurred at the time of the instantaneous trip.

In FIG. 3, the transient 24 is below the setting $I_{TT}$, but it exceeds the threshold setting $I_M$. Thus, a pattern signal 158 is generated. If the pattern signal 158 and the subsynchronous current signal 24 intersect, as shown at 160, comparator 140 will provide an output signal.

The following Table I tabulates the complete protection provided by the present invention:

TABLE I

| | | Trip Setting | Detection Time | Signal Origin |
|---|---|---|---|---|
| Transient | Instantaneous (ITT) | 2-3 PU | 34 ms. max. | wide band filter |
| | Mid-Range (MRTT) | 0.5-2 PU | 0.5 S. | wide band filter |
| Self-Excited | Slow Rate of Rise (SRRT) | 0.01 PU up | 200 ms. min. | narrow band filter |
| | Fast Rate of Rise (FRRT) | 0.05 PU | 50 ms. min. | narrow band filter |

I claim:

1. Apparatus for providing output signals responsive to subsynchronous currents flowing in a three-phase electrical power system having a three-phase voltage generated at a synchronous power frequency, comprising:

first means providing three signals responsive to the currents flowing in the three phases of the three-phase electrical power system, second means providing three reference signals, said reference signals being constant amplitude, synchronous frequency, sinusoidal three-phase signals, multiplier means multiplying each of the current related signals of the first means by a different reference signal of the second means, to provide three output signals responsive to the products of the multiplied signals, said output signals each having first, second and third elements having frequencies responsive to (1) twice the synchronous frequency, (2) the sum of each subsynchronous frequency, and the synchronous frequency, and (3) the difference between the synchronous frequency and each subsynchronous frequency, respectively, summing means summing the three output signals of said multiplier means to provide a summed signal, said summing means providing the positive sequence component of the three elements of the output signals of said multiplier means, and filter means responsive to said summed signal, said filter means providing a subsynchronous current signal responsive to the positive sequence component of a subsynchronous current flowing in the three-phase electrical power system.

2. The apparatus of claim 1 wherein the filter means includes a wide band filter turned to pass the third element of the summed signal while substantially blocking the first and second elements, and a narrow band filter tuned to a predetermined subsynchronous frequency.

3. The apparatus of claim 1 wherein the filter means provides a plurality of subsynchronous current signals, each responsive to the positive sequence component of a subsynchronous current flowing in the three-phase electrical power sysem at predetermined different subsynchronous frequencies.

4. The apparatus of claim 3 wherein the filter means includes a wide band filter tuned to pass the third element of the summed signal while substantially blocking the first and second elements, and a plurality of narrow band filters each tuned to one of the predetermined different subsynchronous frequencies.

5. The apparatus of claim 1 wherein the multiplier means multiplies a first pair of signals from the first and second means, with the signals of another pair multiplied by the multiplier means being the next signals, in phasor rotation, to those in the first pair.

6. The apparatus of claim 1 including detector means responsive to the subsynchronous current signal, said detector means providing a trip signal in response to predetermined parameters of the subsynchronous current signal.

7. The apparatus of claim 6 wherein the filter means includes a wide band filter and a narrow band filter, and wherein the detector means includes transient detector means responsive to the output of said wideband filter, and self-excited transient means responsive to the output of said narrow band filter.

8. The apparatus of claim 7 wherein the transient detector means includes first trip means which provides a trip signal when the subsynchronous current signal exceeds a first predetermined magnitude, and second trip means which generates a pattern signal and provides a trip signal only when the subsynchronous current signal exceeds said pattern signal.

9. The apparatus of claim 8 wherein the pattern signal generated by the second trip means is responsive to the frequency of the subsynchronous current signal.

10. The apparatus of claim 8 wherein the pattern signal generated by the second trip means is independent of the frequency of the subsynchronous current signal.

11. The apparatus of claim 8 wherein the second trip means generates a pattern only after the first half cycle of the subsynchronous current signal, and only when the subsynchronous current signal exceeds a predetermined monitoring level.

12. Apparatus for monitoring an electrical power system having a voltage generated at a synchronous frequency, for subsynchronous current oscillations, comprising:

first means providing a first signal responsive to current flowing in the electrical power system, said first signal having first, second and third elements having frequencies responsive to (1) twice the synchronous frequency, (2) the sum of each subsynchronous current and the synchronous frequency, and (3) the difference between the synchronous frequency and each subsynchronous frequency, respectively, wide band filter means responsive to said first signal, said wide band filter means providing a second signal responsive to the third element of the first signal, narrow band filter responsive to said second signal, said narrow band filter providing a third signal responsive to a subsynchronous current oscillation at a first predetermined frequency, and first and second detector means responsive to said second and third signals, respectively, said first and second detector means providing trip signals in response to predetermined parameters of said second and third signals.

13. The apparatus of claim 12 wherein the first detector means includes full-wave rectifier means for rectifying the second signal.

14. The apparatus of claim 12 wherein the electrical power system is a three-phase system, and the first signal provided by the first means is responsive to the positive sequence component of the signals responsive to the difference between the synchronous frequency and each subsynchronous frequency.

15. The apparatus of claim 12 wherein the first detector means includes first trip means which provides a trip signal when the subsynchronous current signal exceeds a first predetermined magnitude, and second trip means which generates a pattern signal and provides a trip signal only when the subsynchronous current signal exceeds said pattern signal.

16. The apparatus of claim 15 wherein the pattern signal generated by the second trip means is responsive to the frequency of the subsynchronous current signal.

17. The apparatus of claim 12 wherein the pattern signal generated by the second trip means is independent of the frequency of the subsynchronous current signal.

18. The apparatus of claim 15 wherein the second trip means generates a pattern signal only after the first half cycle of the subsynchronous current signal, and only when the subsynchronous current signal exceeds a predetermined monitoring level.

19. The apparatus of claim 18 wherein the second trip means provides a trip signal only when the frequency of the subsynchronous signal is in a predetermined range.

20. The apparatus of claim 18 wherein the second trip means provides a trip signal only when the frequency of the subsynchronous current signal is in one of a plurality of different frequency ranges.

* * * * *